United States Patent [19]

Grant

[11] Patent Number: 4,515,306
[45] Date of Patent: May 7, 1985

[54] FOUR-TERMINAL ZONE THERMOSTAT

[76] Inventor: Willie T. Grant, 400 S. Simms St., Lakewood, Colo. 80228

[21] Appl. No.: 494,411

[22] Filed: May 13, 1983

[51] Int. Cl.³ .............................................. G05D 23/19
[52] U.S. Cl. ..................................... 236/9 A; 165/22; 236/94; 337/373
[58] Field of Search .................. 337/373, 109; 236/94, 236/49, 9 A; 165/22

[56] References Cited

U.S. PATENT DOCUMENTS

| | | | |
|---|---|---|---|
| 1,676,921 | 7/1928 | Phelan et al. | 337/373 |
| 1,951,663 | 3/1934 | Kriechbaum | 236/9 A X |
| 2,167,695 | 8/1939 | Stewart | 236/9 A |
| 2,225,080 | 12/1940 | Newman | 337/373 X |
| 2,240,003 | 4/1941 | McGrath | 236/9 A |
| 2,274,614 | 2/1942 | Nessell | 236/9 A X |
| 2,329,636 | 9/1943 | McGrath | 236/9 A X |
| 2,420,043 | 5/1947 | Johnson | 236/9 A X |
| 2,699,922 | 1/1955 | Herbst | 236/9 A X |
| 2,751,153 | 6/1956 | Seifert | 236/9 A |
| 2,980,780 | 4/1961 | Kardos | 337/373 X |
| 3,185,794 | 5/1965 | Scarr, Jr. | 337/373 X |
| 3,231,703 | 1/1966 | Grahl et al. | 337/373 X |
| 3,249,721 | 5/1966 | Baak | 337/109 X |
| 3,284,002 | 11/1966 | Edelman et al. | 337/373 X |

Primary Examiner—William E. Tapolcai

[57] ABSTRACT

A manually and automatically operable four-terminal zone thermostat for use with automatic damper means when thermostatic means are required to operate fuel control means of a heating/cooling device and motor means rotating said damper means. The thermostat has a four-terminal switch operable by a heat sensitive bimetal spring; said spring operating the switch to energize and deenergize said fuel control means and motor means in accordance with temperature requirements of environment which said thermostat monitors.

12 Claims, 10 Drawing Figures

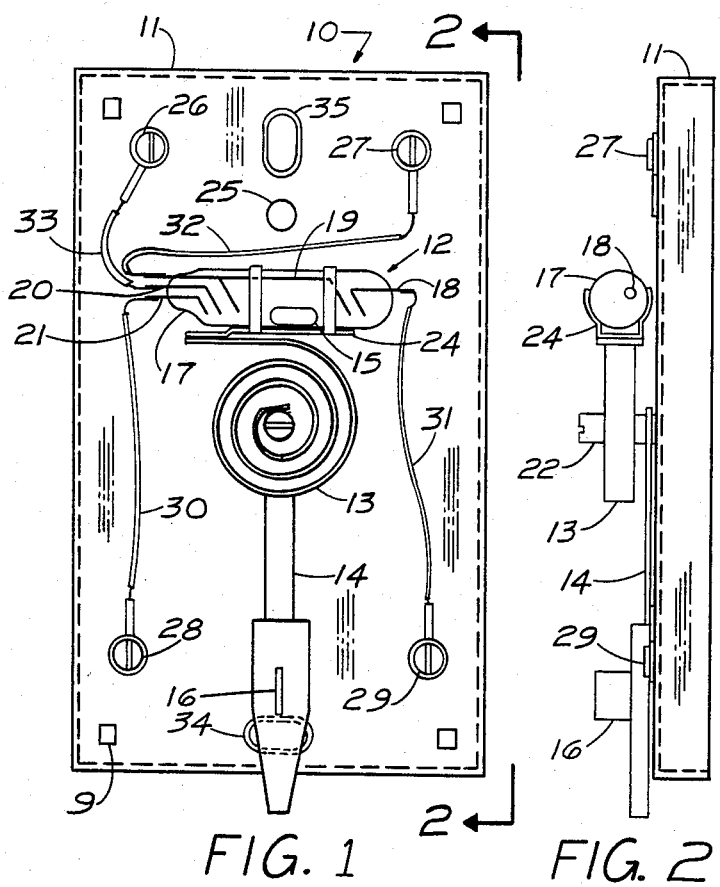
FIG. 1
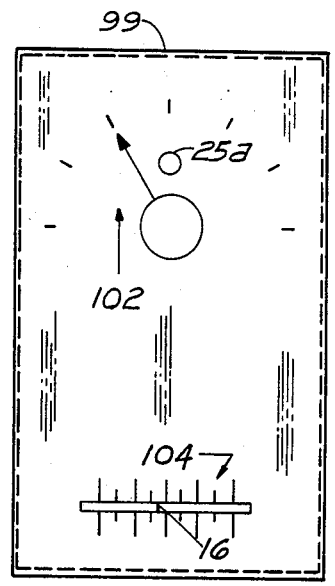
FIG. 2
FIG. 3
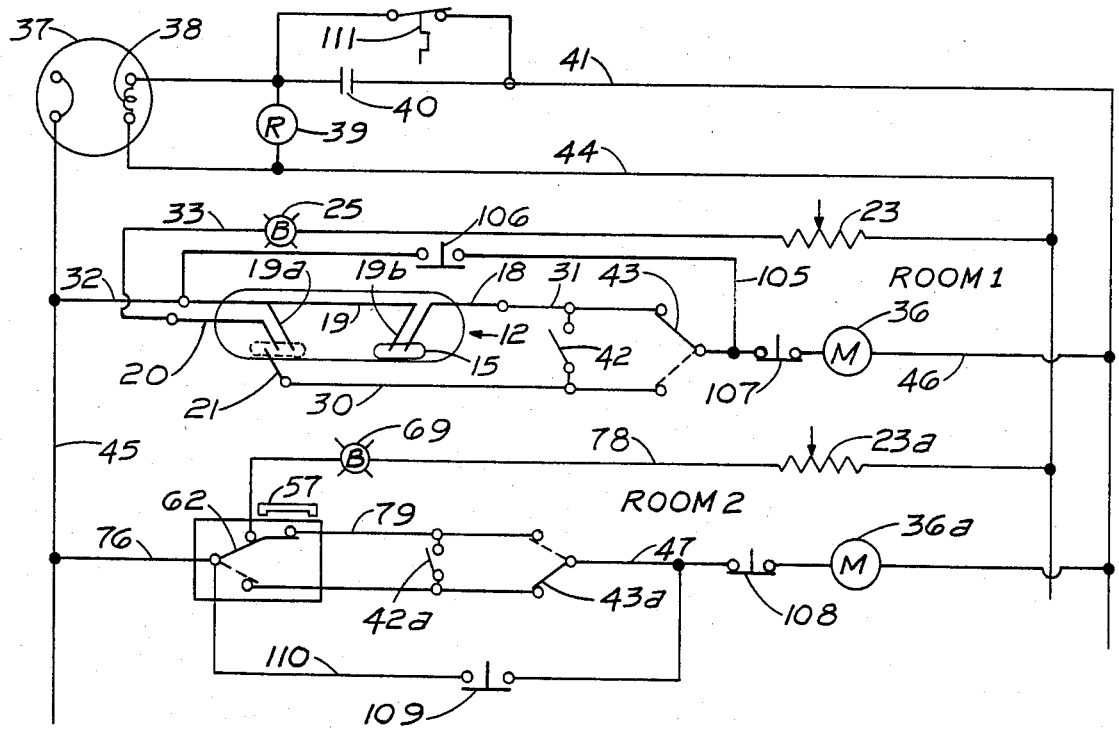
FIG. 4

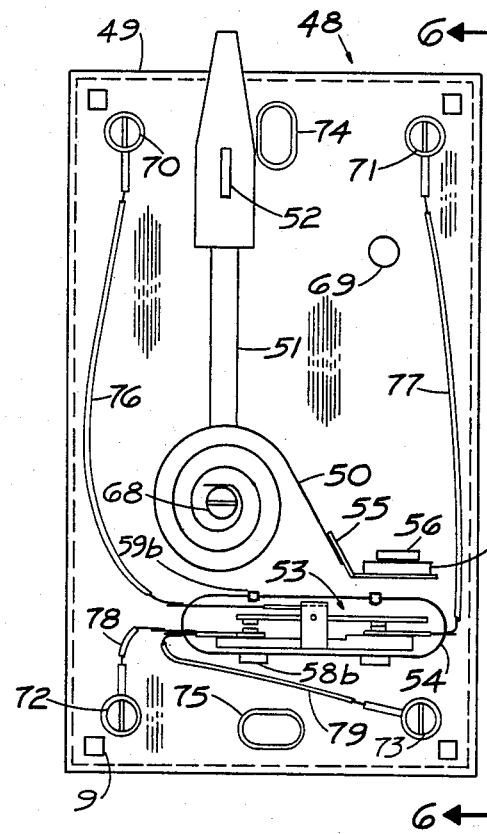
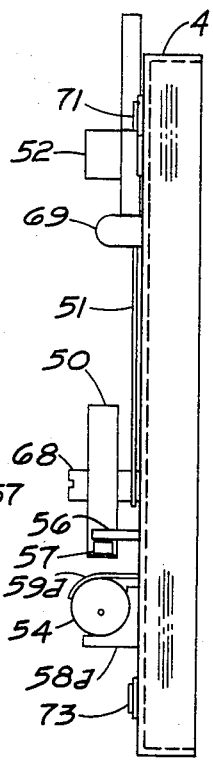
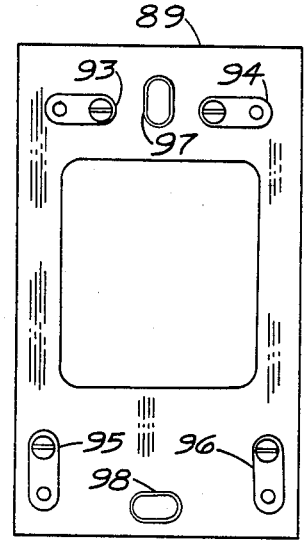
FIG. 5  FIG. 6  FIG. 7
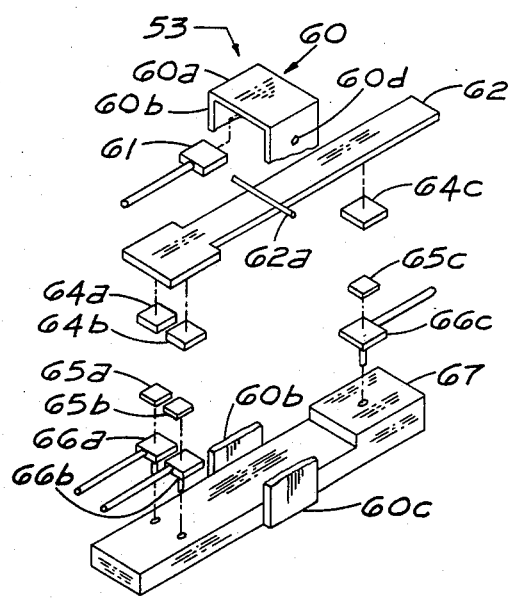
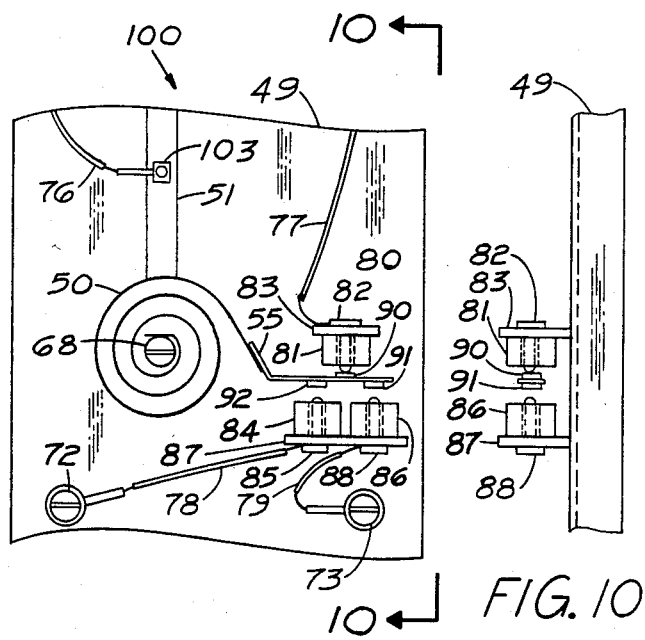
FIG. 8  FIG. 9  FIG. 10

FOUR-TERMINAL ZONE THERMOSTAT

Single pole double throw (SPDT) switches used in zone thermostats have three terminals connected by three conductors to a zone valve or damper motor. The invention of an automatic damper operator comprising the subject of patent application Ser. No. 328,814 requires zone thermostats having (SPDT) switches incorporating four wires to provide operating circuits to fuel control means of a heating/cooling device and to damper motor means; said motor means including an electrical rotary motor or solenoid motor means and switch means. The automatically controlled dampers of said patent application requires a four-terminal thermostatic switch to restrict the formation of a secondary circuit and the accompanying current flow that develops when a standard three-wire zone thermostat is selected to function as a part of the electrical system of the automatically controlled damper means.

In FIG. 6 of Ser. No. 328,814 it can be seen that when a thermostat downstream of thermostat 28 is energizing solenoid 43 and current flows along the dashed conductor connecting relay 34 and solenoid 43, current also feeds back through conductor 48, switch lever 1 (when closed) of switch 26, and energizes motor 23. As cam 24 repeatedly opens and closes switch operators 1 and 2 of switch 26, motor 23, continuously energized, rotates dampler blade 11 for as long as another thermostat requires current to energize solenoid 43.

The four-terminal thermostatic means of the present invention provides a fourth independent terminal to accommodate conductor 48 shown in FIG. 6 of Ser. No. 328,814 and thereby resolves the aforesaid problem associated with the three-wire thermostat.

The subject thermostatic means, being a preferred embodiment, are comprised of four individual terminals spatially separated within an enclosure, each said terminal connecting to a current conductor; a heat sensitive bimetallic spring having attachment to a base by means of a rotatable center shaft; a sealed enclosure housing a mercury bubble (switch operator) and aforesaid terminals; said enclosure being attached to an extremity of said spring; covering means; mounting means; and switch operating means. The center support shaft attaching to said base has said switch operating means comprising a manually operated lever arm rigidly attached to said center shaft. Movement of the lever arm and an integral temperature setting indicator to a selected temperature position rotates said bimetal spring causing said mercury bubble to translate along the longitudinal axis of the enclosure. When said indicator is moved to a temperature position that is lower than the present room temperature, the mercury bubble envelopes the ends of two said terminals and cooperates with other circuit components to energize the damper motor means; rotating damper means to a closed position as described in Ser. No. 328,814.

When said indicator is moved to a temperature position higher than said room temperature, said bimetal spring rotates said enclosure, and said mercury bubble translates to the opposite end of the enclosure contacting the ends of three (3) of said terminals thereby closing a first circuit energizing the fuel control means of a heating/cooling device and closing a second circuit energizing aforesaid motor means; said motor means rotating said damper means to the open position set forth in Ser. No. 328,814.

In addition to manual operations, said heat sensitive bimetal spring automatically contracts when the temperature falls below a room reference temperature, and the enclosure is rotated causing the mercury bubble to contact the aforesaid three (3) terminals and energize said circuits connecting to said fuel control means and motor means. When the temperature rises above the room temperature, said spring expands and rotates the enclosure in the opposite direction causing the mercury bubble to translate and deenergize the fuel control means circuit and contact aforesaid terminals to energize damper closing circuit of motor means; said motor means therein rotating said damper means to a closed position.

The subject thermostatic means have two of four conductors, connecting thermostatic switch means to said fuel control means of said heating/cooling device and to remaining two conductors connecting said thermostatic switch means to said motor means through motor control means.

First alternate thermostatic means provide a four terminal thermostatic switch means incorporating reed switch construction; said reed switch being mounted within a fixed enclosure. The reed switch has a switch operator pivotally mounted to a base and operable by a magnet attaching to the extension of a heat sensitive bimetal spring; said spring being attached to said base by means of a center shaft and fastener.

Movement of a lever arm attaching to said shaft rotates said spring and said magnet attaching to the spring extension. When said lever arm is moved counterclockwise to a temperature lower than the room temperature, the spiral spring rotates in the same direction moving the magnet away from the enclosure containing the thermostatic switch means. The aforesaid switch operator, being released by said magnet, returns to the initial position thereby closing a set of contacts connecting thermostatic switch means and motor control means to said motor means and energizing said motor means to close said damper means. When said lever arm is rotated clockwise to a temperature position higher than said room temperature, said spring also rotates clockwise, placing said magnet on top of said enclosure containing said reed switch means; and the magnetic force of said magnet rotates the switch operator to a position closing the switch contacts that energize the fuel control means and influences said motor to open damper means.

In addition to the manual operations, the bimetal spring responds to temperature changes in a manner identical to that described for the mercury operated thermostatic switch means. When the room temperature falls below the reference temperature, the bitmetal spring lowers the magnet onto the reed switch enclosure forcing the switch operator to close the switch contacts and energize circuits to the fuel control means of said heating/cooling device and to said motor means; said motor means responding to rotate damper means.

When the temperature rises above said reference temperature, aforesaid bimetal spring rotates the magnet in the opposite direction lifting said magnet from the switch enclosure; said magnet releases said switch operator thereby opening previously closed circuits and closing other contacts to reenergize motor means; said motor means rotate aforesaid damper means to a closed position.

The thermostatic means of a second alternate replaces the mercury switch with a snapping switch having fixed terminals mounted above and below contacts attached to the movable extremity of the bimetal spring. When the room temperature rises above a reference temperature the spring extremity rotates the movable contacts counterclockwise to mate with the fixed terminal mounted above the spring termination, closing a circuit and permitting said motor means to rotate said damper means to a closed position. As the temperature falls below the reference temperature, the bimetal spring rotates the movable contacts in the opposite direction to mate with terminals below the spring termination and energize circuits of the fuel control means, relay means, and motor means; said motor means rotating damper means to an open position. Relay means in combination with a temperature switch work in combination to operate motor means in conjunction with a blower of the heating/cooling device.

It is therefore a primary objective of the present invention to provide a thermostatic means to operate automatic damper means with a minimum of components.

It is also a principal object of the present invention to provide thermostatic means that eliminate unwanted secondary circuits.

Another object is to provide thermostatic means capable of being constructed from state-of-the-art components.

Another object is to provide a thermostatic control that is relatively inexpensive and easily installed.

These and other objects and advantages of the present invention will become evident after considering the following detailed specification which covers a preferred embodiment thereof in conjunction with the accompanying drawings, wherein:

FIG. 1 is an elevational view showing a four-terminal thermostatic means;

FIG. 2 is an elevational view taken along line 2—2 of FIG. 1;

FIG. 3 is an elevation showing the front view of covering means for said thermostatic means;

FIG. 4 is a schematic diagram showing the electrical connections of thermostatic switch means in pertinent circuits;

FIG. 5 is an elevational view showing a first alternate thermostatic means;

FIG. 6 is an elevational view taken along line 6—6 of FIG. 5;

FIG. 7 is an elevational view showing a mounting plate for securing said thermostatic means;

FIG. 8 is an exploded view showing the components of a four-terminal reed switch;

FIG. 9 is a partial elevation showing a second alternate snapping switch;

FIG. 10 is a partial elevation taken along line 10—10 of FIG. 9.

Considering the drawings in more detail, number 10 in FIG. 1 shows four-terminal thermostatic means having manual and automatic modes of operation for controlling the temperature in a designated room. Mounting plate 89 of FIG. 7 attaches to an external surface by means of fasteners placed in holes 97 and 98; said fasteners being secured in a manner common to thermostat installations. Base 11 (FIG. 1) attaches to said mounting plate 89 (FIG. 7) by means of screw fasteners 26–29 (FIG. 1) mating with threaded holes in fasteners 93–96 (FIG. 7).

For protection of switch means mounted on said base, covering means 99 (FIG. 3) is installed over said base 11 in a manner permitting said covering means to be slipped on and off of fixed posts 9 (FIG. 1) attaching to said base. Aforesaid covering means comprises a cover plate having an opening 25a to reflect light means 25 and thermometer 102 attaching to the face of said cover plate; said thermometer acknowledges the present room temperature; and thermostat scale 51 provides the means through which the thermostatic means set the room temperature to be maintained by said heating-/cooling device.

When it is necessary to have the room environment at a temperature exceeding the lowest thermostat setting, operating lever 14 (FIG. 1) is manually moved to place temperature setting indicator 16 on the required setting on temperature scale 104 in FIG. 3. As lever 14 rotates shaft 22 counterclockwise from a first position to a second position in FIG. 1, heat sensitive bimetal spring 13 and thermostatic switch 12 also rotate counterclockwise causing mercury bubble 15 (switch operator) to translate to the left end of enclosure 17 and encapsulate the termini of terminals 19a, 20, and 21, resulting in current flow through conductors 45, 32, 30, 33, 46, a portion of 41 and 44 (FIG. 4). The position of mercury bubble 15 shown in dashed outline in FIG. 4 correlates with the dashed position of cam operated switch 43 in FIG. 4; said cam being attached to the shaft of motor 36. The resulting current flow energizes motor 36, relay 39, and fuel control means solenoid 38, in FIG. 4. When solenoid 38 is energized light means 25 is operable indicating that thermostatic means 10 are presently energizing the central heating/cooling device.

For the operation of relay 39 (FIG. 4) by thermostatic means 10, assume that Room 1 and Room 2 (FIG. 4) are currently being heated. As thermostatic means in Room 2 are satisfied, switch operator 62 in Room 2 moves to the dashed line position to energize motor 36a through switch operator 43a occupying the solid line position. With thermostatic means in Room 1 energizing relay 39 and solenoid 38 (mercury bubble 15 in the dashed line position), normally open contacts 40, operable by relay 39, are in the closed position completing the circuit along conductor 41 for rotation of motor means 36a; and normally closed temperature switch 111, mounted in a flow stream of the flow medium leaving the heating/cooling device, is currently open as a result of the increased temperature of the heated flow medium. When thermostatic means in Room 1 are satisfied, mercury bubble 15 translates to the solid line position to energize motor 36. Since thermostatic means in Room 1 was the last thermostatic means having control over solenoid 38 and relay 39, said relay has been deenergized, opening contacts 40. With contacts 40 in an open condition, motor 36 cannot be energized to rotate associated damper means to a closed position until temperature switch 111 has cooled and returned to a closed position. Thus, damper means of Room 1 will remain in an open position (as desired) until temperature switch 111 closes or said relay means are again energized through thermostatic switch means.

Adjustable heater 23 (a resistance wire or resistor) of FIG. 4, included in the circuit connecting relay 39 and solenoid 38 generates useful heat as current flows through said heater; said heater 23 assisting in warming said bimetal spring 13 thereby helps to control room environment by preventing said heating/cooling device from overshooting reference temperature set on thermostat scale 104 (FIG. 3); aforesaid heat along with heated air emanating from aforesaid heating/cooling device warms bimetal spring thereby causing said spring to rotate in clockwise direction translating mercury bubble 15 to the right hand end of enclosure 17 (FIG. 1) deenergizing solenoid 38 and relay 39; said mercury encapsulates the ends of terminals 18 and 19b resulting in current flow through conductors 45, 32, 31, switch 43 (solid line position), conductor 46, motor 36, conductor 41, and contacts 40, when said contacts are in a closed position. The resulting current flow energizes motor 36 for operating aforesaid damper means. As long as temperature setting indicator 16 remains set on the reference temperature, the foregoing cycle will continue to be repeated providing maintenance of the required temperature based environment.

First alternate thermostatic means 48 shown in FIG. 5, having fourwire reed switch means 53 produce results similar to those heretofore described for thermostatic means 10. The bimetal spring 50 of FIG. 5 has magnet 57 mounted on spring extension 55. Enclosure 54 houses said reed switch means 53 shown in FIG. 8; said switch means 53 having base 67 and bridge 60 pivotally supporting switch operator 62 through pin 62a and holes 60d; said switch operator being common to circuits utilizing contact 65c at one end and contacts 65a and 65b at the opposite end; said contacts being attached to base 67 through terminals 65a-65c (FIG. 8). Base 67 of said switch means 53, being of non-conducting material, supports terminals 66a-66c; said terminals having contacts 65a-65c mating with contacts 64a-64c respectively of rotatable switch operator 62. Conductor 76 of FIGS. 4 and 5 energizes said switch operator 62 through terminal 61, bridge 60, and pin 62a of FIG. 8.

When lever arm 51 places temperature setting indicator 52 (FIG. 5) at a temperature setting above the present room temperature, bimetal spring 50 rotates clockwise, placing magnet 57 atop enclosure 54 housing reed switch means 53. The magnetic force of said magnet lifts the right end of switch operator 62 (FIGS. 5 and 8) and lowers the left end of said switch operator 62; said switch operator pivoting about pin 62a mates contact 64a with 65a and 64b with 65b, and separates contact 64c from 65c. In FIG. 4 current consequently flows through conductor 45, switch operator 62, conductors 76, and 78, light means 69, heater 23a, relay 39, and solenoid 38 by means of conductor 44 energizing said relay and solenoid. When thermostatic means 48 has been satisfied bimetal spring 50 contracts, removing magnet 57 from atop said enclosure 54 placing said magnet against bar stop 56; said magnet 57 releases switch operator 62 permitting said switch operator to rotate in a clockwise direction closing contact 64c onto 65c and energizing motor 36a (FIG. 4) allowing motor rotation to close damper means in accordance with thermostatic demands.

The four-terminal thermostatic means 100 having several components identical to thermostatic means 48 of FIG. 5 are shown in partial elevation in FIG. 9 with modifications to switch means comprising a second alternate whose operation will be explained. Reed switch means 53 of FIG. 5 has been replaced by snapping switch means 80, and magnet 57 of FIG. 5 has been replaced by contacts 90-92. Snapping switch means 80 comprise two button magnets 81 and 86 enclosing terminals 82 and 88 respectively and a non-magnetic cyclinder 84 enclosing terminal 85. Magnet 81 and terminal 82 are mounted on support 83; and magnet 86 and terminal 88 are mounted on a common non-conducting support 87 with cylinder 84 and terminal 85.

When lever arm 51 rotates in a clockwise direction placing temperature setting indicator 52 (FIG. 5) above the present room temperature, bimetal spring 50 also rotates clockwise, mating contacts 91 and 92 with terminals 88 and 85 respectively. Current flow in FIG. 4 is identical to that heretofore described for contacts 64a and 64b mating with contacts 65a and 65b respectively of FIG. 8. As thermostatic means 100 of FIG. 9 are satisfied, spring 50 rotates counterclockwise opening aforesaid circuits and mating contact 90 with terminal 82 to energize motor 36a through the dashed line position of switch 62 and solid line representation of switch 43a, permitting said motor means to rotate damper means to a closed position Switch 42, being an override switch, is electrically connected in parallel with switch 43 and operated by a cam attached to the shaft of said motor 36 (FIG. 4); said override switch being maintained in a closed position by said cam as the motor rotates thereby preventing said motor from being deenergized at intermediate positions during a required energized cycle should the thermostatic means experience a satisfied condition during said motor rotation.

FIG. 4 schematically shows a typical normally open switch 106 and a typical normally closed switch 107 wired in series with thermostatic switch 12 and motor 36; both said switches being manually operated. Under normal operating conditions first manual switch 107 remains in a closed position permitting motor 36 to operate damper means in an automatic mode in combination with thermostatic means. In other circumstances manual switch 107 can disengage motor 36 from the circuit, leaving damper means in any position from fully open to fully closed. Normally open second manual switch 106, being a manual switch, operates motor means and damper means independently of aforesaid thermostatic switch means.

It is understood that thermostat base 11 (FIG. 1), heater 23 (FIG. 4), covering means 99 (FIG. 3), light means 25 (FIGS. 1 and 4), motor means, relay 39 with contacts 40 (FIG. 4), override switch 42, two-way swtich 43, manual switches 106 and 107, and mounting plate 89 (FIG. 7) though described in relation to the preferred embodiment or an alternate are common to the preferred embodiment and all described alternates without exception.

Thus there has been shown and described thermostatic means which fulfills all of the objects and advantages sought after. Many changes, modifications, variations and other uses and applications of the present device will, however, become apparent to those skilled in the art after considering this specification and accompanying drawings. All such changes, modifications, variations and other uses and applications which do not depart from the spirit and scope of the invention are deemed to be covered by the invention which is limited only by the claims which follow.

I claim:

1. Thermostatic means electrically interlocking fuel control means of heating/cooling means to motor means of automatic damper means, said damper means regulating and controlling a heating/cooling medium flowing from said heating/cooling means; said thermostatic means simultaneously operating said fuel control means and damper means; said thermostatic means comprising:

(a) switch means, said switch means having thermostatic switch means, said thermostatic switch means having four terminals, said terminals being electrically interconnected in selective combinations by a movable switch operator; said switch means, having connection to and, operating said fuel control means and said motor means in cooperation with motor control means;

(b) sensing means, said sensing means having a heat sensing element attaching to a movable shaft and an electric heater operable by current flow through said switch means;

(c) support means, said support means comprising a mountable base and hardware; said support means supporting said sensing means, said switch means and covering means; said covering means having temperature measuring means, light reflecting means, and temperature setting indicating means; said base having a separate plate mountable on an external surface and supporting said base;

(d) indicating means, said indicating means comprising light means electrically interconnecting with said switch means and communicating the operational status of said heating/cooling means; said temperature measuring means communicating a present room temperature; said temperature setting indicating means communicating a boundary condition.

2. The means defined in claim 1 wherein said theremostatic switch means having said multiple terminals interconnecting said fuel control means and said motor means through said motor control means, said sensing means, said indicating means, and motor switch means; an element of said motor control means being operable by temperature of said heating/cooling means.

3. The means defined in claim 1 wherein said switch means having a multiple switch connecting to said thermostatic switch means and energizing said motor means in combination with said thermostatic switch means; an override switch connecting in circuit combination with said multiple switch and said motor means; a first manual switch disengaging said motor means from said circuit; a second manual switch connecting in circuit combination to said thermostatic switch means, permitting independent, manual control of said motor means.

4. The means defined in claim 1 wherein said thermostatic switch means having fluid means interconnecting selective combinations of said terminals housed in a common movable enclosure.

5. The means defined in claim 1 wherein said thermostatic switch means, being of reed switch construction, and having multiple electrical terminals mounting in an enclosure; a first combination of said terminals energizing a switch operator; said switch operator being movable by magnetic means, said switch operator energizing circuits connecting said fuel control means to said indicating means and said motor means.

6. The means defined in claim 1 wherein said thermostatic switch means, being of snapping switch construction, and comprising multiple stationary terminals afixed to said base; said heat sensing means and said movable operator, said heat sensing means having electrical characteristics energizing electrical contacts attaching thereto; said movable operator having attachment to said heat sensing means; said stationary terminals having magnetic means and being attached in combination to said base of said support means.

7. Thermostatic means controlling the temperature of an environment of a room or zone being air conditioned by heating/cooling means having fuel control means; said room or zone having damper means operable by motor means and said thermostatic means; said thermostatic means comprising;

(a) switch means, said switch means having thermostatic switch means, said thermostatic switch means having four terminals, said terminals being electrically interconnected in selective combinations by a switch operator; said switch means having connection to and operating said fuel control means and said motor means in cooperation with motor control means;

(b) sensing means, said sensing means having a heat sensing element attaching to a movable shaft and an electric heater operable by current flow through said switch means;

(c) support means, said support means comprising a mountable base and hardware; said support means supporting said sensing means, said switch means and covering means; said covering means having temperature measuring means, light reflecting means, and temperature setting indicating means; said base having connection means to an external surface;

(d) indicating means, said indicating means comprising light means electrically connecting to said switch means and communicating the operational status of said heating/cooling means; said temperature measuring means communicating a present room temperature; means; said temperature setting indicating means communicating a boundary temperature.

8. The means defined in claim 7 wherein said thermostatic switch means having said multiple terminals interconnecting said fuel control means and said motor means through said motor control means, said sensing means, said indicating means, and motor switch means; an element of said motor control means being operable by temperature of said heating/cooling means.

9. The means defined in claim 7 wherein said switch means having a multiple switch connecting to said thermostatic switch means and energizing said motor means in combination with said thermostatic switch means; an override switch connecting in circuit combination with said multiple switch and said motor means; a first manual switch disengaging said motor means from said circuit; a second manual switch connecting in circuit combination to said thermostatic switch means, permitting independent, manual control of said motor means.

10. The means defined in claim 7 wherein said thermostatic switch means having a mobile element connecting selective combinations of said terminals housed in a common movable enclosure.

11. The means defined in claim 7 wherein said thermostatic switch means, being of reed switch construction, and having multiple electrical terminals mounting in an enclosure; a first combination of said terminals energizing said switch operator; said switch operator being movable by magnetic means, said switch operator energizing circuits connecting said fuel control means to said indicating means and said motor means.

12. The means defined in claim 7 wherein said thermostatic switch means, being of snapping switch construction, and comprising multiple stationary terminals afixed to said base; said heat sensing means and said movable operator, said heat sensing means having electrical characteristics energizing electrical contacts attaching thereto; said movable operator having attachment to said heat sensing means; said stationary terminals having magnetic means and being attached in combination to said base of said support means.

* * * * *